United States Patent [19]

von Wimmersperg

[11] Patent Number: 4,480,870

[45] Date of Patent: Nov. 6, 1984

[54] INFANT RESTRAINT FOR VEHICLES

[76] Inventor: Heinrich F. von Wimmersperg, 15721 Rosemont Rd., Detroit, Mich. 48223

[21] Appl. No.: 310,494

[22] Filed: Oct. 13, 1981

[51] Int. Cl.³ .............................................. B60R 21/10
[52] U.S. Cl. .................................. 297/216; 297/250; 297/377; 297/464
[58] Field of Search ............... 297/216, 250, 254, 377, 297/464; 296/65 A

[56] References Cited

U.S. PATENT DOCUMENTS

| | | | |
|---|---|---|---|
| 1,689,091 | 10/1928 | Watt | 5/94 |
| 3,145,395 | 8/1964 | Rosman | 5/94 |
| 3,645,548 | 2/1972 | Briner | 297/254 X |
| 4,047,755 | 9/1977 | McDonald et al. | 297/216 |
| 4,067,608 | 1/1978 | von Wimmersperg | 297/216 |
| 4,113,306 | 9/1978 | von Wimmersperg | 297/250 |
| 4,186,962 | 2/1980 | Meeker | 297/250 |
| 4,215,900 | 8/1980 | Coult | 297/254 |
| 4,231,612 | 11/1980 | Meeker | 297/250 |
| 4,301,983 | 11/1981 | Horan | 297/216 X |

*Primary Examiner*—James T. McCall
*Attorney, Agent, or Firm*—Barnes, Kisselle, Raisch, Choate, Whittemore & Hulbert

[57] ABSTRACT

An infant restraint for use in a vehicle has a frame adapted to be securely fastened to the vehicle seat and on which an infant support shell is pivotally mounted and yieldably retained in a position for supporting the infant in a comfortable, somewhat reclining position. When the restraint is mounted on a vehicle seat with the shell in a rearward-facing direction, the shell swings to a more erect position in the event of a frontal crash, thereby avoiding injury to or ejection of the infant from the restraint.

24 Claims, 22 Drawing Figures

INFANT RESTRAINT FOR VEHICLES

This invention relates to an infant restraint for vehicles.

A rear-facing infant restraint for vehicles normally has to serve at least two different purposes. During normal driving the restraint has to support the back and the head of an infant safely and comfortably. When the vehicle becomes involved in a frontal crash the restraint has to serve as an impact shield to decelerate safely the kinetic energy of the fast-moving head and trunk of the infant. At the age of five months or younger an infant is not sufficiently physically developed to hold its head in an upright position nor is it able to sit in an upright position. If the infant support is too erect, the infant will slide down until its buttocks and shoulders are the only supported portions of its body. When an infant is so supported, vertical movements of a vehicle during driving can cause harmful loading of the unsupported center section of its spine.

I have determined that an infant restraint can support a child safely and comfortably if it has a back support for the child that is tilted between 40° and 50° from the vertical. If the back support of a rearwardly-facing infant restraint is tilted more than about 50° from the vertical, the probability of ejection of the infant from the restraint in a frontal crash is increased considerably.

A rearwardly-facing infant restraint which is supported solely on a car seat cushion and restricted in a forward direction by a seat belt will normally tilt violently downwardly in a frontal crash. To overcome this problem a shoulder harness on the restraint is frequently provided to restrain the infant and to prevent ejection of the infant from the restraint. However, only few parents utilize a shoulder harness even when it is provided and very few use it properly and in a correct position. However, even a properly used shoulder harness does not render the infant restraint completely safe. For example, in a dynamic test simulating a 30 mile per hour impact, a shoulder harness on a dummy representing a 17 pound, 5 month old infant is loaded with the inertia force of about 120 pounds. In addition, the infant's head exerts a pull on the neck of the infant of about 24 pounds. It is obvious that such loads can be very harmful to infants of this age and size.

The primary object of the present invention is to provide a rear-facing infant restraint having a back and head support which meets the anatomical requirements of safety and comfort during normal riding and which, in the event of a frontal crash, tilts to a more erect position to serve as an impact shield and simultaneously safely decelerates the head and the trunk of the infant.

More specifically, it is an object of this invention to provide an infant restraint which, in the event of a frontal crash, assumes an erect position which avoids the tendency for the head or trunk of the infant to move relative to the restraint and, thus, permit ejection of the infant.

A further object of this invention is to provide an infant restraint that is designed to safely and comfortably support a child and requires merely a conventional lap restraint rather than an impractical shoulder harness.

Another object of the invention resides in the provision of a restraint in the form of a shield pivotably and adjustably mounted on a rigid frame and designed such that it serves as as infant restraint when in a rearwardly-facing position and a car seat for an older child when in a forwardly-facing position. In conjunction with this object, the restraint of this invention is further designed so as to compel the parent to properly position and support the restraint when used in either the rearwardly-facing position or as a forwardly-facing child seat.

Another object of the invention is to provide an infant restraint provided with a releasable latch mechanism which is adjustable so as to support the child in a reclining position to varying extents and which, in the event of a frontal crash, swings to a generally erect position.

In general, the restraint of the present invention comprises a shell or shield mounted for pivotal movement on a supporting frame. The frame is designed so that in a rearwardly-facing direction its upper end is substantially fixedly supported by means engaging a rigid portion of the vehicle so that the support frame is positively prevented from tilting downwardly in the event of a frontal crash. The shell or shield is normally supported on the frame in an inclined rearwardly-facing position and is designed to automatically tilt to a more erect position in the event of a frontal crash.

Other objects, features and advantages of the present invention will become apparent from the following description and accompanying drawings, in which.

Figure 1:
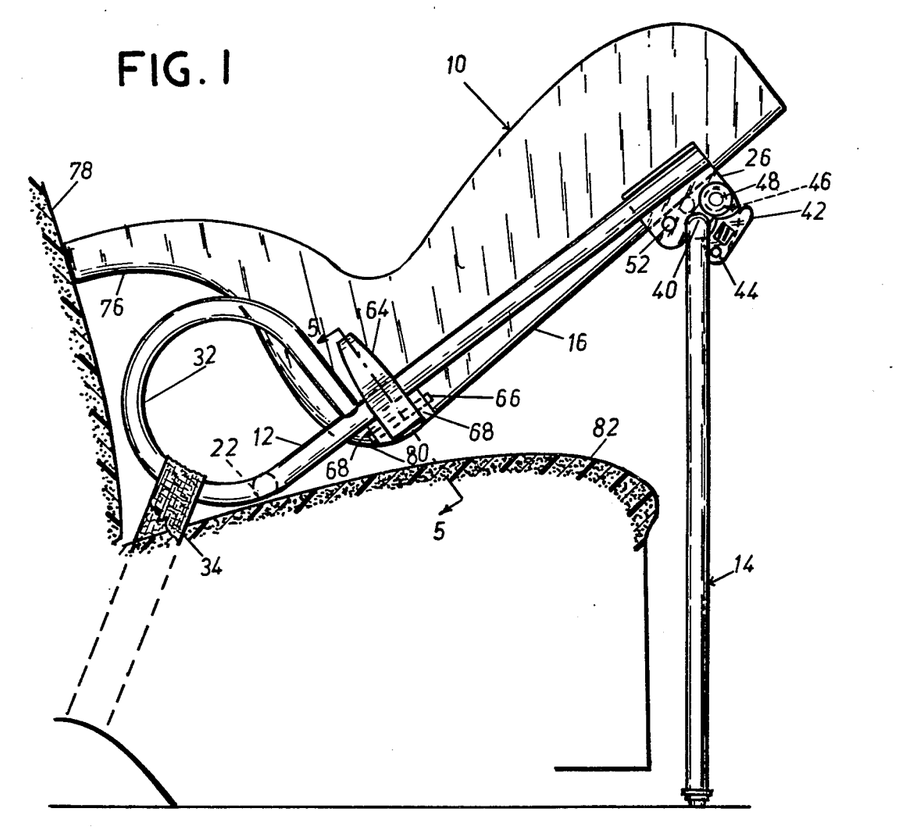
FIG. 1 is a side elevational view of a restraint according to the present invention showing it arranged in a vehicle in a normal rear-facing riding position.

Referring to FIGS. 1 through 8, the infant restraint of this invention comprises a shell or shield 10 pivotally mounted on a supporting frame 12 which at its upper end is supported by an upright leg member 14. Shell 10 is preferably molded from plastic or the like in the form of a seat having a back and head support section 16 and a seat and leg support section 18. Supporting frame 12 (FIG. 2) includes a pair of tubular side members 20 interconnected adjacent their lower ends by a cross bar 22 and adjacent their upper ends by a cross bar 24 having fixed plates 26 at the opposite ends thereof which are in turn fixedly secured to the upper ends of the tubular members 20. Shell 10 is pivotably supported on frame 12 by means of a pair of brackets 28 (FIG. 4) encircling cross bar 24 and secured to the upper end portion of backrest 16 by screws or other fastening devices 30. The lower ends of the side members 20 are formed into generally circular loops 32 through which a conventional seat belt 34 is adapted to be extended and secured for mounting the device on a vehicle seat as shown in FIG. 1.

The leg member 14 is of generally inverted U shape and consists of a pair of spaced apart legs 36 rigidly interconnected at their upper ends by a bight portion 38. Bight portion 38 has a length slightly greater than the spacing between plates 26 and is adapted to be rotatably seated within downwardly opening notches 40 in the two plates 26. A spring biased detent 42 pivotably mounted on each plate 26 as at 44 is adapted to engage the under side of bight portion 38 adjacent each end to retain it in a rotatably seated position within notch 40. A lock 46 is brazed, welded or otherwise permanently secured to the bight portion 38 adjacent the opposite ends thereof. Each lock includes a spring-biased plunger 48 (FIG. 7), the end of which is adapted to project into a slightly oversized opening 50 in each plate 26. When plunger 48 is engaged in opening 50 leg member 14 will be in a generally vertically upright position as shown in FIG. 1. Leg member 14 can be pivoted in notches 40 to a position generally parallel to and extending upwardly from the side members 20 of support frame 12 by disengaging plungers 48 from within openings 50, swinging the leg upwardly and re-engaging the plungers 48 in a second opening 52 in each plate 26. When plungers 48 are engaged in openings 52 leg 14 can serve as a handle for a stroller as disclosed in my U.S. Pat. No. 4,113,306.

Figure 3:
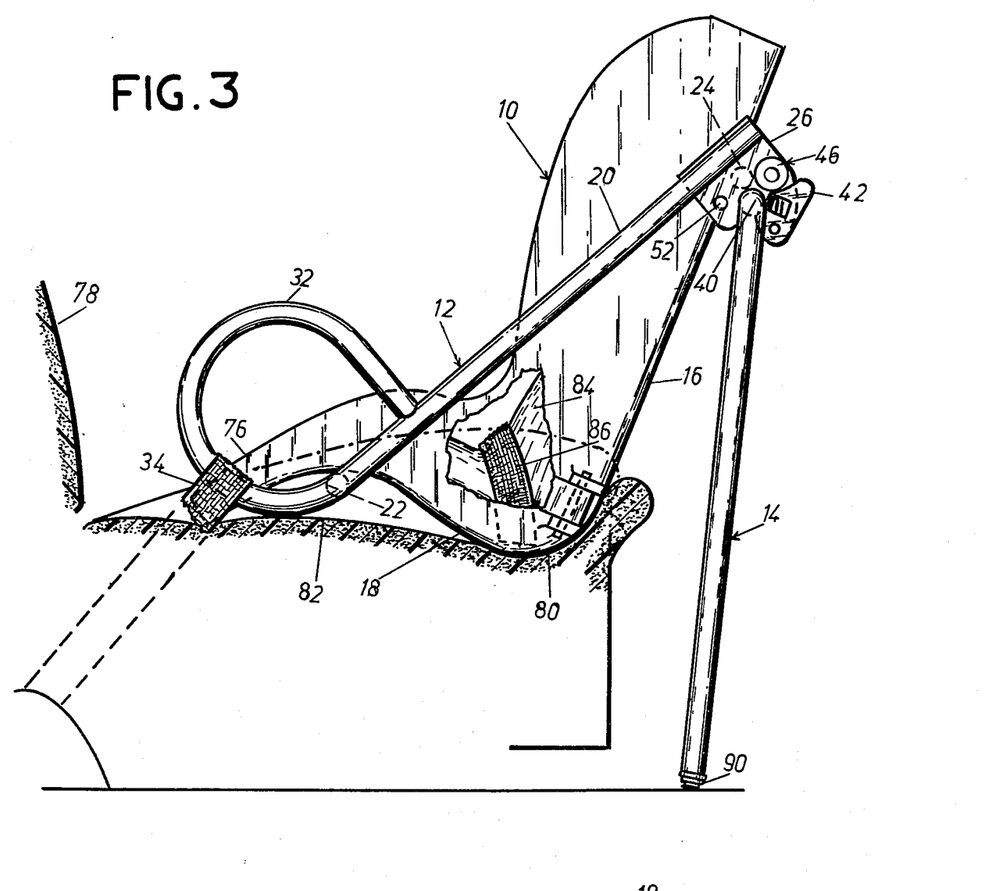
FIG. 3 is a side elevational view of the restraint illustrating the position it assumes in the event of a frontal crash.
Figure 4:
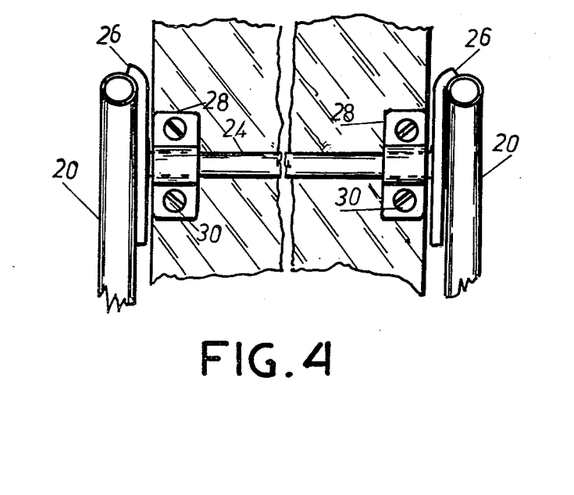
FIG. 4 is a fragmentary elevational view illustrating the manner in which the shell or shield is mounted on the supporting frame.
Figures 6, 7, 8:
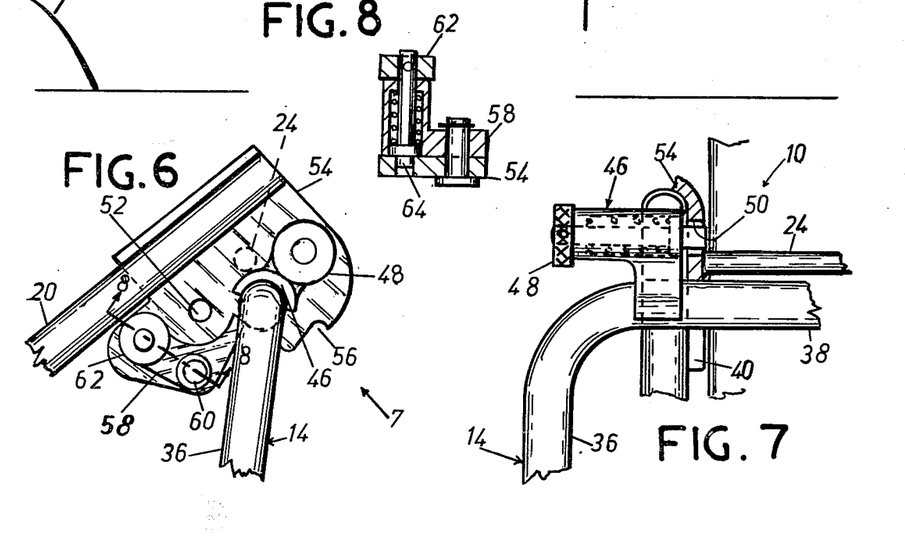
FIG. 6 is an enlarged fragmentary view of a modified locking arrangement for adjusting the angular position of the supporting legs relative to the supporting frame.
FIG. 7 is a fragmentary end view, partly in section, in the direction of arrow 7.
FIG. 8 is a fragmentary sectional view along the line 8—8 in FIG. 7.

The arrangement shown in FIGS. 6 through 8 for retaining and adjusting leg 14 differs only slightly from that shown in FIGS. 1 and 3. As shown in FIG. 6, the plates 54 which support the leg 14 are formed with a notch 56 on the lower edge thereof on the opposite side of notch 40 from opening 52. When leg member 14 is swung toward frame 12 so that its legs 36 are adjacent and generally parallel to the side members 20 of frame 12, the end of each plunger 48 is adapted to engage with notches 56 to hold the leg member 14 in this collapsed position.

In the arrangement shown in FIGS. 6 through 8 the bight portion 38 of leg member 14 is adapted to be pivotally retained within notch 40 by means of a detent 58 pivoted on each plate 54 as at 60. Each detent 58 is provided with a spring-biased plunger 62, the end of which is adapted to engage in an opening 64 in plate 54 to retain leg member 14 within notches 40 of these plates.

Referring now to FIGS. 1 through 5, the shell 10 has a pair of latches 64 pivotally mounted at each side thereof as by a pin 66 extending through a pair of lugs 68 at each side of the shell. Latches 64 are located generally adjacent and slightly above the junction 80 between the back and head support section 16 and the seat and leg support section 18. The latches extend upwardly from the pivot pins 68 and preferably in a direction generally perpendicular to the plane of the back and head support section 16. Each latch 64 is in the form of a lever biased against the outer surface of the shell by a spring 70. The inner face of each latch 64 is formed with a socket 72 adapted to encircle each of the tubular members 20 of the supporting frame 12 to normally retain the shell in the inclined position illustrated in FIG. 1. Each socket 72 is formed with a cam face 74 which, when the downward or forward force on the shell exceeds a predetermined value, is engaged by the encircled portion of the encircled tubular member 20 to cam the latch 64 outwardly against the bias of spring 70 and thereby permit the shell to swing to the more erect position illustrated in FIG. 3.

In the normal riding position illustrated in FIG. 1 it will be noted that the free end 76 of the seat and leg support section 18 of the shell is closely adjacent or engages the back rest 78 of the vehicle seat and the portion 80 of the shell at the junction of the back and head support section 16 and the seat and lug support section 18 is spaced above the underlying seat cushion 82 of the vehicle seat. Thus, in the normal riding condition the end portion 76 of the shell engages the back rest 78 to prevent substantial rearward movement of the shell relative to the vehicle seat and the seat belt 34 engaged through the loops 32 restrains the shell against movement in a forward direction relative to the vehicle seat. If desired, a child 84 (FIG. 3) placed in the shell can be secured therein by a suitable lap belt 86.

In the event of a frontal crash the vehicle decelerates rapidly. However, the masses of the infant head and trunk, as well as of the shell itself, produce inertia forces tending to displace the entire unit forwardly. When the inertia forces of the shell and infant increase to a predetermined value, they overcome the restraining affect of the spring-biased latches 64 and the shell rotates in a counterclockwise direction as viewed in FIG. 1 to a more erect position; that is, to the position shown in FIG. 3 wherein the seat belt 34 is slightly stretched and, thus, slightly more inclined toward the horizontal and the portion 80 of the shell is embedded in the compressible seat cushion 82.

When the shell assumes the position shown in FIG. 3, the maximum inertia forces are directed primarily against the back and head support section 16 of the shell. Thus, the infant molds itself into the deep padding 83 with which the interior of the shell is lined and which thereby produces a barrier against relative movement of the infant and the shell. Since, as shown in FIG. 3, the back and head support section 16 is almost vertical, the deceleration of the infant's head and back occurs simultaneously and no substantial forces are generated that tend to separate the head from the infant's trunk. Thus, the infant's neck is not subjected to any injurious forces. In view of the fact that the back and head support section 16 approaches a generally vertical position, a shoulder harness on the shell is not necessary to prevent ejection of the infant. The back and head support section 16 serves as an ideal impact shield for the infant. Likewise, it will be noted that substantial rebound of the shell after the impact is prevented by abutment of the free end of latch 64 with the tubular member 20. Latch 64 can be dimensioned in length so as to practically eliminate any rebound of the shell.

Figure 5:
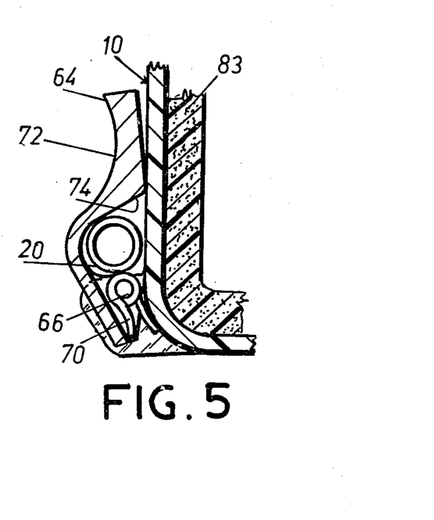
FIG. 5 is a sectional view taken generally along the line 5—5 in FIG. 1.

As shown in FIG. 5, the shell 10 is preferably lined with a slow-memory urethane foam cemented thereto. A lining of this type not only provides the necessary padding, but also eliminates the tendency for any sliding action of the infant within the shell.

In the arrangement thus far described the frame 12 and the leg member 14 are dimensioned such that in the riding position of the unit illustrated in FIG. 1 the shell is inclined such that the head and back rest support section 16 is inclined to the vertical at an angle of about 40°–50°. It has been determined that when the shell is so inclined, the infant is supported in a comfortable, semi-reclining position and will not tend to slide downwardly in the shell. This results from the fact that the feet and leg support section 18 is inclined to the back and head support section 16 generally at an angle of about 90°.

As mentioned previously, in the event of a frontal crash, the shell pivots on frame 12 about the cross bar 24 as an axis to a more upright position and, because of the slight stretching and greater inclination of the seat belt 34, the leg member 14 may pivot slightly within the notches 40 in plates 46 so that it inclines slightly forwardly in a vertically upward direction. The extent to which the shell pivots relative to the frame may be determined by the interengagement of the junction 80 of the shell with seat cushion 82 or, in any event, by interengagement of the free end 36 of the seat and leg support section 18 with the cross bar 22 or the portion of seat belt 34 threaded through loops 32. The frame and shell are so proportioned and designed such that, in the event of a frontal crash, the shell will pivot to the position illustrated in FIG. 3 wherein the head and back support section 16 is inclined to the vertical at an angle of between about 20° to 25°.

In view of the fact that the height of the vehicle seat cushion 82 may vary with vehicles of different types, the legs 36 of the upright leg member 14 may be constructed so as to be adjustable in length. For example, each short rubber pad 90 inserted into the lower end of each leg member 36 (FIG. 1) may be replaced by the foot 92 illustrated in FIG. 1a. Each foot 92 is preferably in the form of a tubular member having an enlarged radial flange 94 fixed thereon at a location spaced unequally from the opposite ends of the foot. A rubber plug 96 is preferably inserted into each end of foot 92 and, in order to maintain either end of the foot in telescopic engagement with the lower end of the legs 36, the foot is also provided with a pair of snap rings 98 spaced equally from flange 94 for interengagement with a groove 100 adjacent the lower end of the tubular member 36. With the arrangement shown in FIG. 1a the length of each leg 36 can be lengthened from the showing in FIG. 1 by inserting either end of foot 92 into the lower end of the leg. Thus, the length of legs 36 can be adjusted as desired in any conventional vehicle so that in the riding position of the restraint the back and head support section 16 of shell 10 is inclined to the vertical at an angle of between about 40° to 50°, which, as pointed out above, positions the infant in a comfortable and safe riding position. If seat cushion 82 is too low, a folded blanket or other spacer can be arranged between the seat cushion and loops 32.

Figure 9:
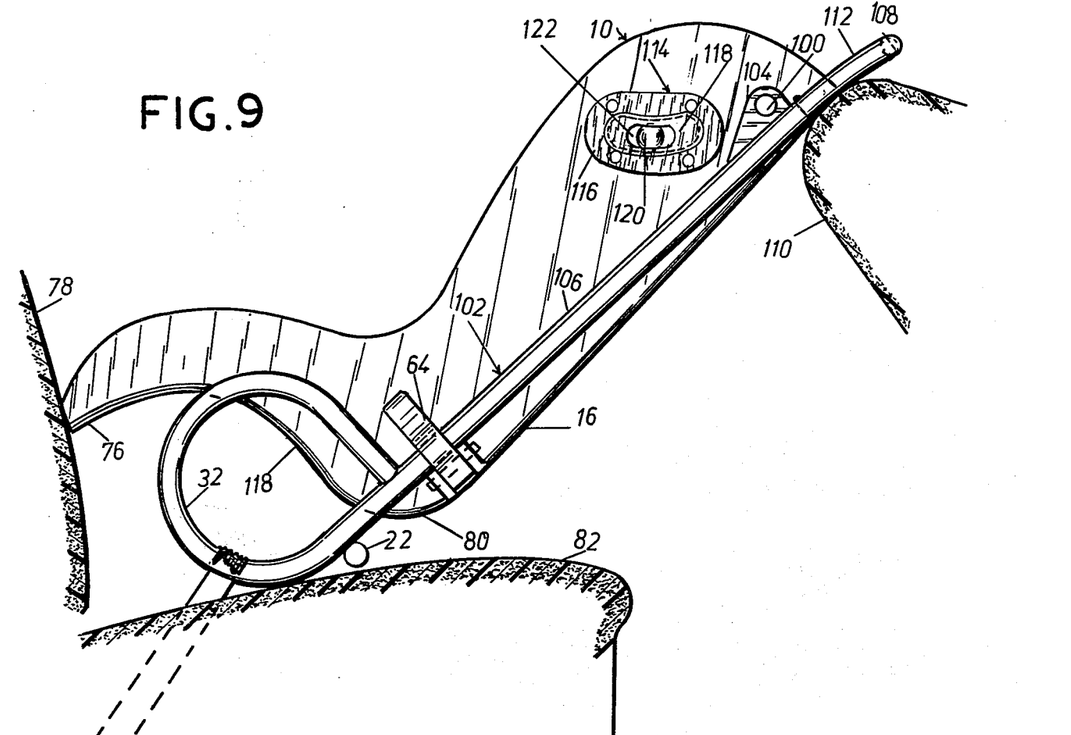
FIG. 9 is a side elevational view of a second embodiment of infant restraint according to the present invention and showing the restraint arranged in a vehicle in the normal rear-facing riding position.

In smaller sized vehicles, or in larger sized vehicles where the front seat is shifted to a forward position, the upright leg member 14 shown in FIG. 1 need not be employed. Thus, as shown in FIG. 9, the shell 10 may be pivotally supported as at 100 on frame 102 by a pair of brackets 104 welded to the side members 106 of the frame. The lower portion of frame 102 is formed with the loops 32 and provided with the cross bar 22 in a manner similar to frame 12. However, the upper end of tubular members 106 at each side of frame 102 are extended upwardly to at least the upper end of shell 10 and interconnected by a bight portion 108. When the unit is modified in this manner the upper end of frame 102 can be supported on the dash panel 110 of the vehicle to maintain the shell at the desired inclination in the riding position.

If desired, frame 12 can be utilized to form frame 102 by simply providing an insert 112 for the upper ends of the side tubular members in which case the insert 112 can be simply telescoped into the open upper ends of the side tubular members and formed with the bight portion 108. The latch 64 in the embodiment illustrated in FIG. 9 is constructed and operates in the same manner as the latch described in connection with FIGS. 1 and 3.

In order to insure the parent that the unit is properly arranged in the riding position, that is, such that the shell is inclined to the vertical at an angle of between about 40° to 50°, a visual gage may be mounted on the shell so as to verify the fact that the unit is properly arranged. Such a gage is shown in FIG. 9 and generally referenced 114. Gage 114 comprises a plate 116 secured to the side of the shell and is fashioned with an arcuate embossment 118 renders the ball 120 visible when the back and head support section 116 is inclined to the horizontal at the desired angle; namely, between about 40° to 50° to the vertical. When the ball is at the center of the window the shell will be inclined at an angle of about 45°.

Figure 10:
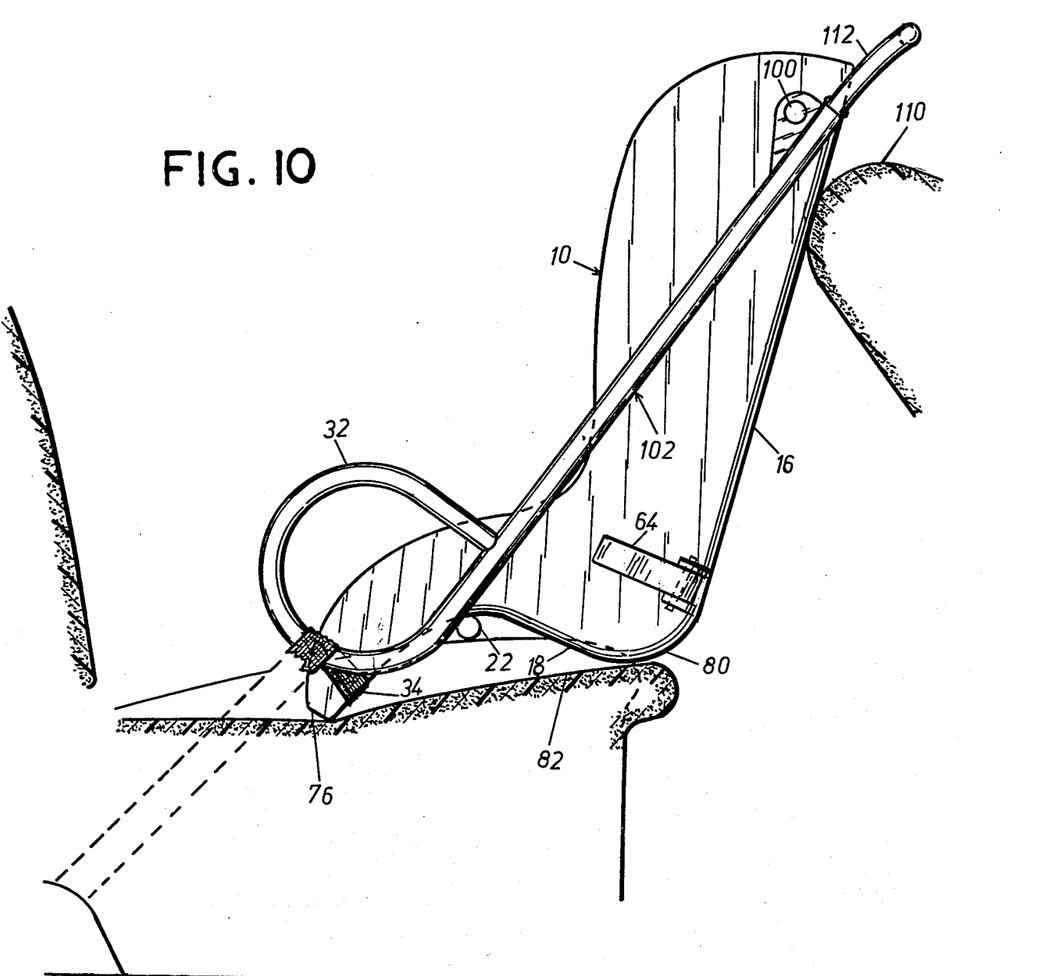
FIG. 10 is a side elevational view showing the position assumed by the restraint illustrated in FIG. 9 in the course of a frontal crash.

When the unit is constructed and arranged in the vehicle in the manner illustrated in FIG. 9, in the event of a frontal crash latch 64 yields and the shell swings to the generally upright position illustrated in FIG. 10. Depending upon the specific orientation and dimensional relationships between the unit and the vehicle, the forward pivotal movement of the shell may be arrested in the same manner as illustrated in FIG. 3. However, with some arrangements the junction 80 of the shell may not compress and embed itself into the seat cushion 82. For example, as shown in FIG. 10, the shell can slide upwardly slightly on the dash panel 110 to the extent permitted by the stretching and inclination of the seat belt 34. In such an event the free end 76 of the shell will engage the portion of the seat belt extending through loops 32 and thereby dampen the inertia forces acting on the shell and the infant. In this event the underside of the leg and seat support section 18 will contact cross bar 22 and, at all events, limit the extent to which shell 10 can pivot relative to frame 102. In view of the fact that in the arrangement shown in FIG. 10 the shell is permitted to slide upwardly slightly on the dash panel 110 of the vehicle, in the event of a frontal crash the back and head support section 16 of the shell can assume a position inclined to the vertical at about 16°.

Figure 12:
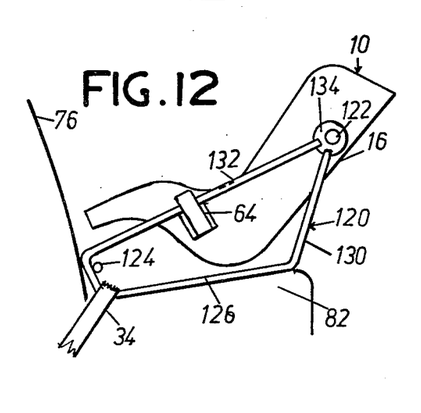
FIG. 12 is a side elevational view of a third embodiment of the invention illustrated in the rear-facing riding position.
Figure 13:
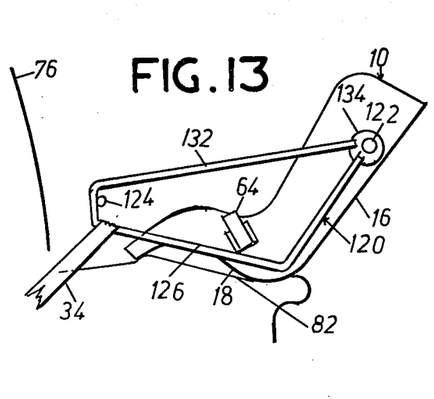
FIG. 13 is a side elevational view of the device shown in FIG. 12 in the position it assumes in the event of a frontal crash.

In the infant restraint illustrated in FIGS. 12 and 13 the shell 10 is of substantially the same configuration and construction as the shells previously described. It is pivotally supported on a frame 120 as at the pivot axis 122. Frame 120 consists of two side members interconnected by a cross bar 124. Each side member comprises a closed loop having a bottom run 126, a short upright rear member 128, an upwardly inclined front member 130 and an upward and forwardly inclined member 132. The upper ends of members 130,132 are interconnected by a hinge plate 134 at the pivot axis 122. The restraint is adapted to be supported on a vehicle seat by placing the bottom runs 126 on the seat and threading the seat belt 34 through the two side members adjacent the junction of the bottom runs 126 and the rear members 128. The inclination of the top member 132 is such that, with latches 64 engaged with the top members 132, the head and back support section 16 of the shell is inclined to the vertical at an angle of about 41°.

In the event of a frontal crash shell 10 pivots in a counterclockwise direction as viewed in FIG. 12 about the pivot axis 122 to the position shown in FIG. 13. The forward movement of the entire unit is restricted by the seat belt 34. Since frame 120 is not supported by a leg member such as shown at 14 in FIG. 1 or by the dash panel as shown in FIG. 10, it tilts clockwise through an angle of approximately 22° as permitted by the stretching and inclination of seat belt 34. At the same time, shell 10 pivots counterclockwise within frame 120 through an angle of about 26° before its movement is arrested by engagement with the vehicle seat. Thus, the ultimate crash angle of the carrier is such that the back and head support section 16 is inclined to the vertical at an angle of about 37°. Tests have shown that with a crash angle of about 37° the back and head support section 16 of the shell is sufficiently erect to prevent ejection of the infant from the shell.

Figure 14:
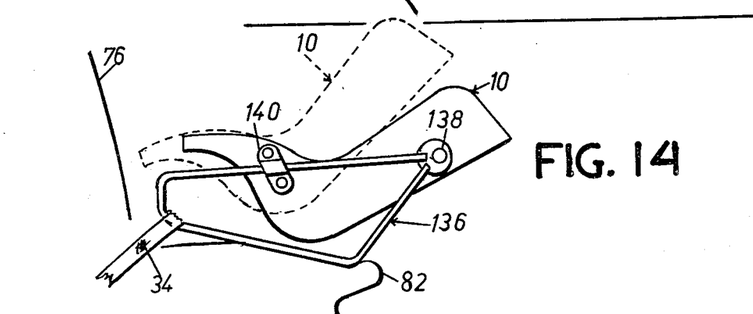
FIG. 14 illustrates a conventional infant carrier in the event of a frontal crash.

In a conventional infant carrier (FIG. 14) where the shell 10 is rigidly and fixedly mounted on a frame such as shown at 136 by the permanent connections as at 138,140, an entirely different result is obtained in the event of a frontal crash. As shown in FIG. 14, the shell and frame pivot in a clockwise direction through an angle of about 22°; thus, the ultimate crash angle will be approximately 63°, thereby making it very likely that an infant would be either ejected from the shell or would be subjected to injurious inertia forces on its head and neck. With a conventional arrangement such as shown in FIG. 14, a complicated and inefficient shoulder harness would be necessary to avoid ejection of the infant in the event of a crash. With applicant's arrangement an easy-to-handle lap belt for the infant is all that is necessary.

Figures 1A, 11:
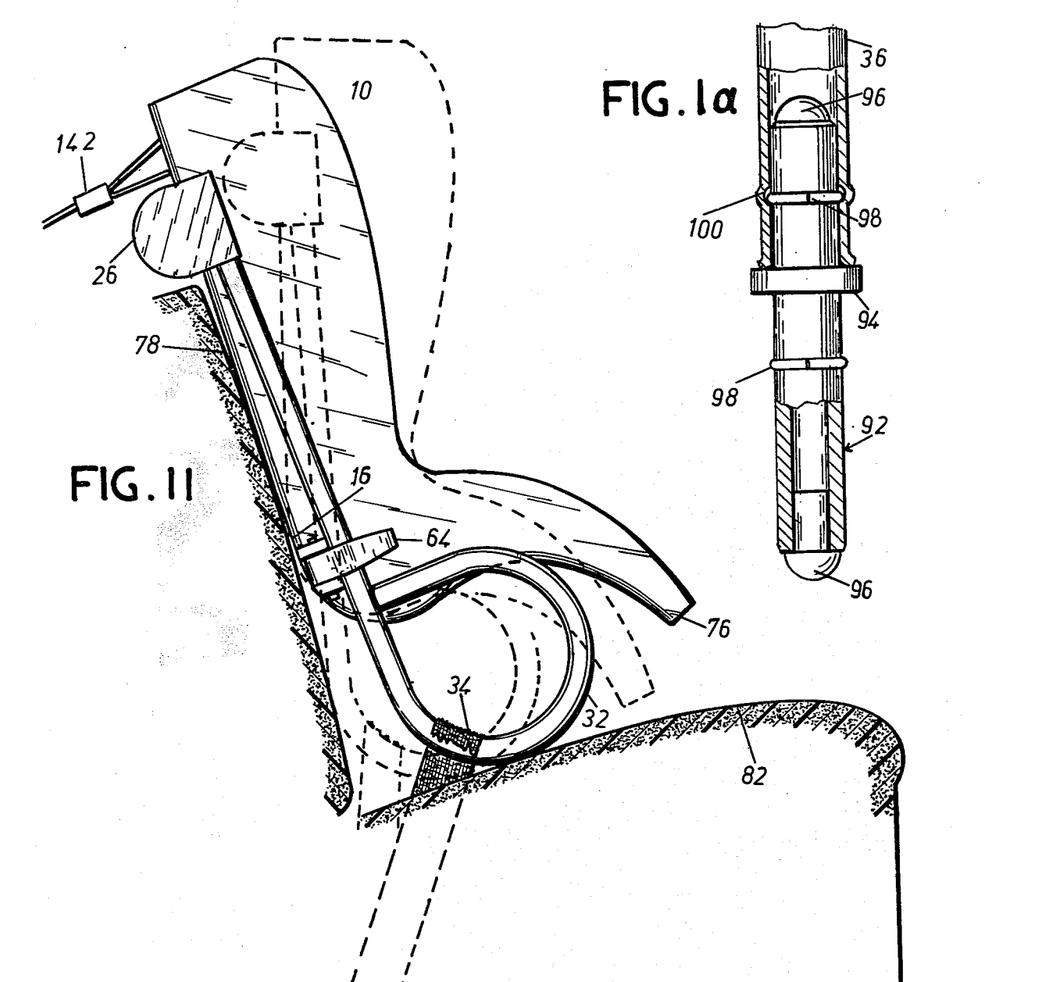
FIG. 1a is a fragmentary sectional view illustrating a means for varying the length of the upright leg for the support frame.
FIG. 11 shows the restraint illustrated in FIG. 1 arranged in a forwardly-facing direction for use as a restraint for an older child, for example, of between one and four years of age.
Figure 2:
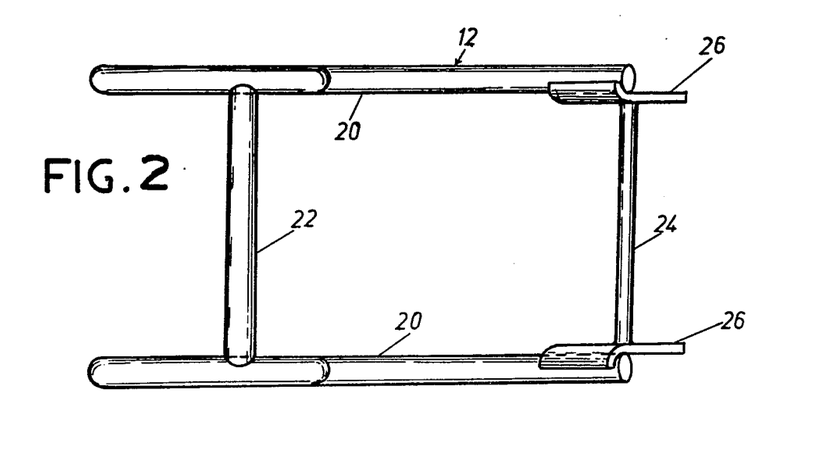
FIG. 2 is a top view of the supporting frame of the restraint shown in FIG. 1.

FIG. 11 illustrates the manner in which the infant restraint shown in FIGS. 1 through 6 can be converted into a forwardly-facing seat for a child of about one to four years of age. To make such a conversion it is only necessary to remove the leg member 14 from the support plate 26 and arrange the carrier as shown in FIG. 11. Thus, with the latch 64 engaged, the seat belt 34 is threaded through the loops 32 of the frame 12 and tightened so that the loops 32 are supported on the seat cushion 82 and the back and head support section 16 of the shell is positioned against the back rest 78 of the vehicle seat. A suitable restraint may be employed to retain the child within the shell 10. To prevent excessive forward tilting movement of the shell in the event of a frontal crash, a tether strap 142 is fastened to the upper end of the restraint and to a fixed portion of the vehicle. If the tether strap 142 is not properly secured so that the back and head rest section 16 of the shell does not lie flat against the seat back 78, this will automatically be indicated when the seat belt 34 is tightened because the entire unit will tilt forwardly away from the back rest 78 about the loops 32. Thus, the parent or other user will, by necessity, be compelled to attach the tether strap 142 correctly.

Figure 15:
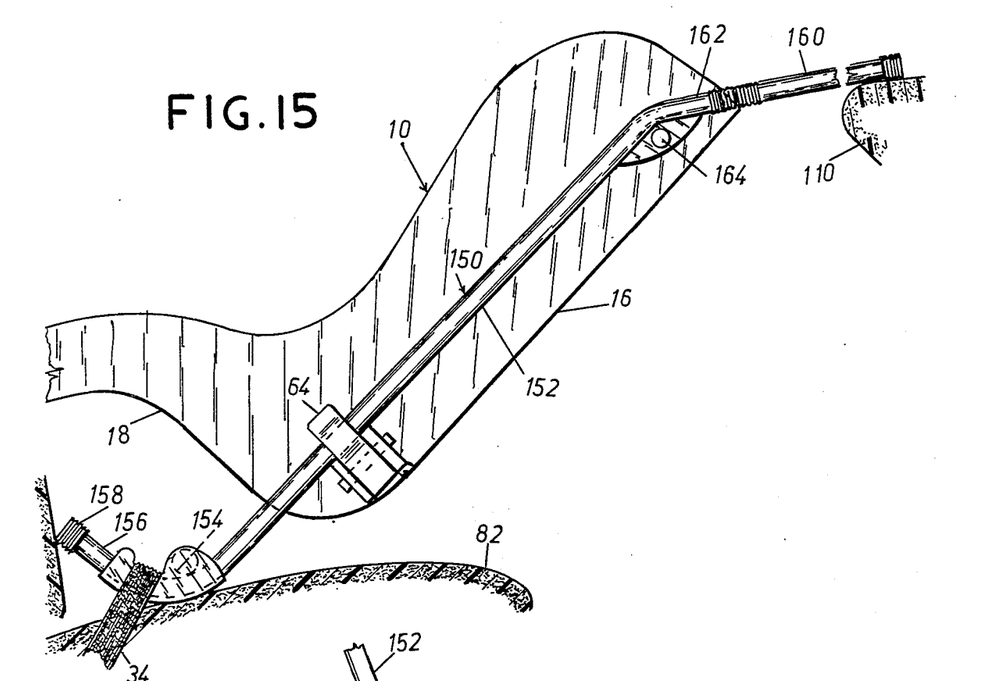
FIG. 15 is a side elevational view of a fourth embodiment of an infant restraint according to the present invention illustrated in the conventional rear-facing riding position.
Figure 16:
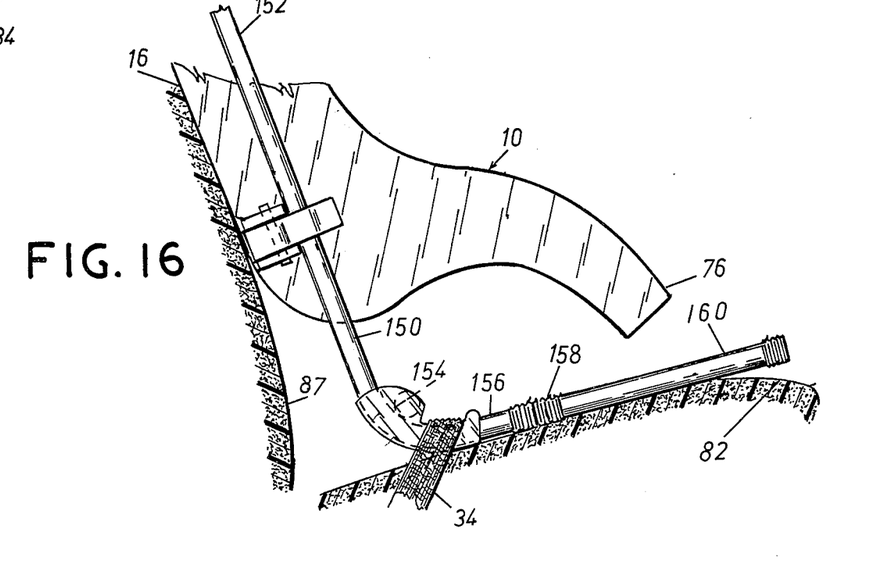
FIG. 16 is a fragmentary side elevational view illustrating the device shown in FIG. 15 arranged in a forwardly-facing position for use as a seat for an older child.

In the arrangement shown in FIGS. 15 and 16 the shell 10 is of the same configuration and construction as the shells previously described. The support frame 150 includes a pair of side members 152 which are interconnected adjacent their lower ends by a cross bar 154. The lower ends 156 of side bars 152 are bent upwardly at approximately a right angle to side bars 152 and are threaded or otherwise formed as at 158 to receive an extension member 160. In FIG. 15 extension member 160 is shown connected to the upper ends 162 of the side members 152 to enable the unit to be mounted in a rearwardly-facing direction on a vehicle seat with the extensions 160 resting upon the dash panel 110 of the vehicle so that the shell in the riding position assumes the same general orientation as the shell shown in FIG. 9. Support frame 150 is secured in place by the conventional seat belt 34 which extends over and across the upwardly bent ends 156 of side members 152. In the event of a frontal crash, latches 64 will release the shell in the manner previously described and the shell will pivot counterclockwise about the pivot axis 164 to a more upright position which will be determined by the interengagement of the lower portion of the shell with cross bar 154 and strap 34 and also possibly by the interengagement of the junction 80 between the back and head support section 16 and the seat and leg support section 18 with the vehicle seat 82. In any event, the shell will swing to an erect position wherein the back and head support section 16 will be inclined to the vertical at an angle of between about 20° to 25° or less.

When it is desired to use the infant carrier shown in FIG. 15 so that the shell 10 is in a forwardly-facing direction, the extension members 160 are removed from the upper end of the frame 150 and engaged with the connections 158 at the lower ends 156 of side members 152. Since the ends 156 of frame 150 are generally perpendicularly related to the side members 152, the extension members 160 rest generally in a flatwise condition on the vehicle seat cushion 82 when the back and head support section 16 of the shell is positioned against the backrest 78 of the vehicle seat. Frame 150 can be secured in place in the position shown in FIG. 16 by the seat belt 134. The extensions 160 are of sufficient length so as to substantially completely overlie the seat cushion in a forwardly direction and thus prevent excessive downward and forward tilting movement of the unit even when the seat belt 34 is tightened. Thus, this arrangement eliminates the need for a tether strap such as shown at 142 in FIG. 11 when the shell is sued in the forwardly-facing direction.

The embodiment shown in FIGS. 15 and 16 does not have the range of frontal impacts which can be accommodated when the shell is in a forwardly-facing direction as the arrangement shown in FIGS. 10 and 11. However, this arrangement is more versatile in its placement since it does not require a tether strap. In the event of a frontal crash, the shell 10 and the frame 150 will both tilt forwardly about the seat belt 34 to an extent determined by the degree to which the extensions 160 are depressed into the compressible seat cushion 82.

In the embodiment illustrated in FIGS. 17 through 21 the shell 10 and frame 150 are substantially the same as those illustrated in FIGS. 15 and 16. The primary difference resides in the latch mechanism. In the arrangement shown in FIGS. 17 through 21 this latch mechanism comprises a hook 166 at each side of the shell which is pivotally mounted as at 168 on a bracket 170. The two brackets 170 are in turn fixedly mounted one on each of the side members 152 of frame 150. Hooks 160 are biased in a counterclockwise direction on brackets 170 by means of torsion springs 172. Hook 160 is formed with a notch 174 for accommodating the teeth 176,178, 180 of retainer bars 182 182 affixed to the opposite sides of shell 10. The leading end face 184 of hook 166 is generally perpendicular to a radial line extending between end face 184 and pivot axis 168. The edge 186 of notch 174 is generally parallel to end face 184 and the opposite edge 188 of the notch is inclined to edge 186. Teeth 176,178 are formed with opposite faces similarly inclined as edges 186,188.

Figures 17, 18, 19, 20, 21:
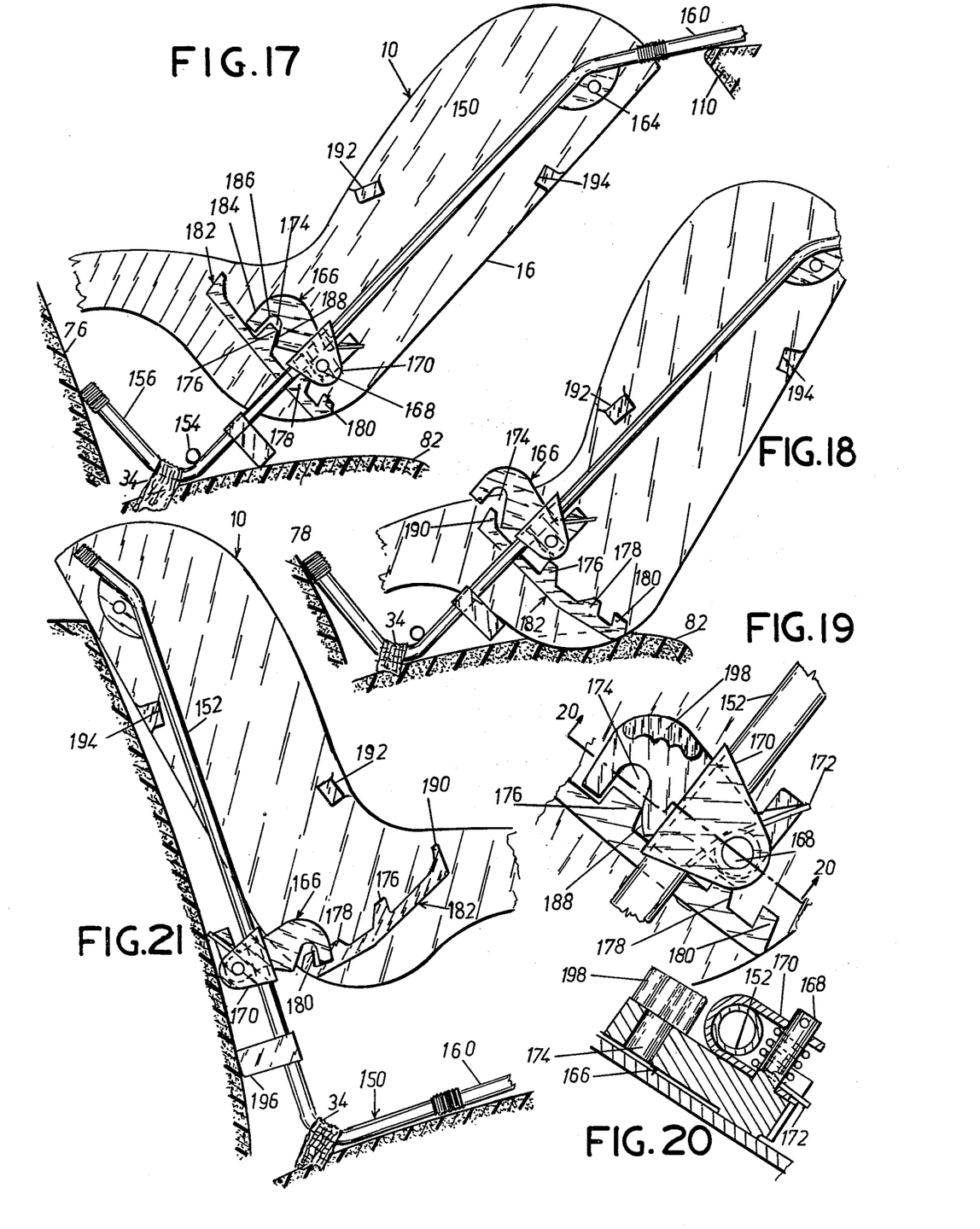
FIG. 17 is a side elevational view of a fifth embodiment of an infant restraint according to this invention illustrated in the rear-facing, riding position.
FIG. 18 is a side elevational view of the restraint shown in FIG. 17 illustrating the position it assumes in the event of a frontal crash.
FIG. 19 is a fragmentary view on an enlarged scale of the release latch.
FIG. 20 is a sectional view along the line 20—20 in FIG. 19.
FIG. 21 is a side elevational view of the restraint shown in FIG. 17 arranged in a forwardly-facing direction.

When the unit is arranged in the manner illustrated in FIG. 17 and secured in place by the seat belt 34, shell 10 is tilted to a position wherein notch 174 of each hook 166 is engaged with the tooth 176 of each retainer 182. The shell is thus retained in the normal riding position wherein the back and head rest support section 16 is inclined to the vertical at an angle of between about 40° to 45°. In the event of a frontal impact, the inclined edge 188 of notch 174 engages the correspondingly inclined face of tooth 176 so as to cam the hook upwardly (clockwise) out of engagement with tooth 176 against the bias of spring 172. The shell thus tilts to the more erect position shown in FIG. 18. The extent of tilting movement of the shell relative to the frame is determined either by the abutment of the junction 80 of the shell with the seat cushion or positively at all events by the abutment of stops 192 on each side of the shell with the side members 152 of frame 150. Upon rebound of the shell after impact, the notch 174 of hook 166 engages the tooth 190 at the leading end of each retainer to prevent any substantial pivotal movement of the shell in a clockwise direction. It will be observed that the spacing between teeth 176 and 190 is adequate to accommodate pivotal movement of hook 166 in a counterclockwise direction to engage tooth 190.

With the arrangement shown in FIGS. 17 through 21, in the normal riding position of the shell hook 166 is preferably engaged with tooth 176 so that the back and head support section 16 of the shell is inclined to the vertical at an angle of about 40° to 50°. However, if it is desired to have the infant in a more reclined position, for example, when the child is sleeping, the shell can be retained in a more horizontally oriented position by engaging hook 166 with tooth 178 or tooth 180. Each of these teeth are formed to cam hook 166 upwardly out of engagement with the retainer against the bias of spring 172 in the event of a frontal impact of the vehicle.

In FIG. 21 the unit is illustrated with the shell 10 in a forwardly facing direction. When the shell is so positioned, hook 166 is preferably engaged with tooth 180 to retain the shell in a comfortable seating and sleeping position for the child. Further counterclockwise movement of the shell relative to the frame is prevented by stops 194 at each side of the shell which engage the side members 152 of frame 150. The frame itself can be held in a position spaced slightly forwardly from the back rest 78 of the vehicle seat either by brackets 170 or spacers 196 mounted on the side members 152 of the frame 150 adjacent their lower ends. Manipulation of hooks 166 for engagement with the desired teeth on retainer 182 may be facilitated by mounting a hand grip 198 on each hook.

I claim:

1. An infant restraint for use in a vehicle comprising a frame, an infant support shell having a back and head support section and a seat and leg support section disposed generally perpendicular to each other, said shell having a fixed pivotal connection adjacent the upper end portion of said back and head support section with said frame for pivotal movement about a generally horizontal axis extending transversely of the shell, said shell having means for mounting it on a vehicle seat in a generally fixed position relative to the vehicle with the shell facing in a direction rearwardly of the vehicle, said mounting means including means adapted to rigidly engage the vehicle to prevent vertical downward displacement of said pivotal connection between said frame and shell, yieldable means interconnecting the shell and frame for retaining the shell on the frame in a normal riding position wherein the back and head support section of the rearwardly-facing shell is inclined substantially to the vertical such that an infant is comfortably supported in a somewhat reclined position by the shell, said yieldable means being responsive to deceleration of the vehicle resulting from a frontal impact to permit the lower portion of the shell to pivot about said fixed axis on the frame in a direction downwardly and forwardly relative to the frame so that the back and head support section of the shell assumes a more erect position and means for limiting pivotal movement of said shell in said direction to said more erect position.

2. An infant restraint as called for in claim 1 wherein said yieldable means are disposed below said pivotal connection.

3. An infant restraint as called for in claim 1 wherein, in said normal riding position, said yieldable means are adapted to retain the shell in a position such that the back and head support section thereof is inclined to the vertical at an angle of between about 40° to 50°.

4. An infant restraint as called for in claim 3 wherein said back and head support section of the shell is inclined to the vertical at an angle of not more than about 37° when the shell pivots to said more erect position.

5. An infant restraint as called for in claim 3 wherein said back and head support section is inclined to the vertical at an angle of not more than about 25° when said shell pivots to said more erect position.

6. An infant restraint as called for in claim 1 wherein said means for mounting the shell on the vehicle seat includes a lower portion of said frame adapted to be engaged by a conventional vehicle safety seat belt for exerting a rearwardly and downwardly inclined force on said frame.

7. An infant restraint as called for in claim 1 wherein said mounting means comprises retaining means adjacent the upper end of the frame and including an upright leg support member having its upper end engaged by said retaining means and its lower end portion supported upon a horizontally rigid portion of the vehicle.

8. An infant restraint as called for in claim 7 wherein the upper end of said leg member is pivotally engaged with said retaining means.

9. An infant restraint as called for in claim 7 wherein said leg member is adjustable in length to vary the inclination of said back and head support section of the shell.

10. An infant restraint as called for in claim 1 wherein said yieldable means comprises a releasable latch means interconnecting said shell and frame.

11. An infant restraint as called for in claim 10 wherein said latch means comprises a pivotally supported latch member which is spring-biased to a locking position to releasably retain the shell in said inclined position.

12. An infant restraint as called for in claim 11 wherein the latch means includes a detent member adapted to be engaged by the latch member, one of said members being mounted on the shell and the other being mounted on the frame, a cam face on at least one of said members for pivoting the latch member out of engagement with a detent member against the spring bias in response to the force on the shell and infant therein resulting from a frontal crash.

13. An infant restraint as called for in claim 12 wherein the latch member is mounted on the shell and the detent member is fixedly mounted on the frame.

14. An infant restraint as called for in claim 12 wherein the latch member is mounted on the frame and the detent member is mounted on the shell.

15. An infant restraint as called for in claim 14 wherein the detent member has a plurality of spaced teeth thereon adapted to be selectively engaged by the latch member for increasing said angle of inclination of the back and head support section of the shell.

16. An infant restraint as called for in claim 12 wherein the latch member has a free end portion adapted to abut against the detent to prevent the shell from rebounding upwardly back to said normal riding position after the latch member releases the shell.

17. An infant restraint as called for in claim 1 including means on said shell and frame adapted to interengage to limit the extent to which the shell can pivot to said more erect position.

18. An infant restraint as called for in claim 17 including means on said shell and frame for preventing substantial rebounding of the shell after a frontal crash.

19. An infant restraint as called for in claim 10 wherein said lower portion of said frame has a pair of members, one at each side of the shell, across which the vehicle seat belt can be extended to secure the frame on the vehicle seat, the lower portion of the shell being adapted to engage the portion of the seat belt extending across said members when said latch means is released to limit the extent to which the shell can swing downwardly and forwardly to said more erect position.

20. An infant restraint as called for in claim 10 wherein said lower portion of the frame has a pair of members disposed one at each side of the shell, means extending transversely between and interconnecting said lower portions of the frame, the lower portion of the shell being adapted to engage said transverse interconnecting means when the latch means is released to limit the extent to which the shell can pivot downwardly and forwardly to said more erect position.

21. An infant restraint as called for in claim 1 wherein said frame includes a pair of elongate support members located one at each side of said shell, the lower ends of said support members being adapted to engage the seat cushion when the frame is mounted on the vehicle seat, the upper ends of said support members pivotally supporting the shell therebetween adjacent their upper ends, said support members being transversely interconnected adjacent their lower ends and forming an open frame through which the shell is adapted to swing when the yieldable means yield in response to a frontal crash.

22. An infant restraint as called for in claim 21 wherein each elongate support member has a foot at the lower end thereof with which the vehicle seat belt is adapted to be connected when the frame is mounted on a vehicle seat, said foot members being adapted to bear downwardly on the vehicle seat cushion when the seat belt is tightened, said foot members providing vertical support to the frame and shell when arranged on the seat with the shell in a forwardly-facing direction.

23. An infant restraint as called for in claim 22 wherein said feet extend forwardly from said elongate members over the seat cushion when the shell is in said forwardly facing position sufficiently to prevent substantial forward tilting movement of said frame when the seat belt is tightened.

24. An infant restraint as called for in claim 22 wherein said feet extend forwardly from said elongate support members over the seat cushion insufficiently to prevent the frame from tilting forwardly when the seat belt is tightened unless the upper end of the frame is restrained against forward movement, such as by a rearwardly-extending tether.

* * * * *